(12) United States Patent
Krishnan et al.

(10) Patent No.: US 11,745,703 B2
(45) Date of Patent: Sep. 5, 2023

(54) ASSEMBLY FOR SENSOR CLEANING WITH SOLENOID

(71) Applicants: Ford Global Technologies, LLC, Dearborn, MI (US); Valeo North America, Inc., Auburn Hills, MI (US)

(72) Inventors: Venkatesh Krishnan, Canton, MI (US); Segundo Baldovino, Novi, MI (US); Ashwin Arunmozhi, Canton, MI (US); Charles Prain, Auburn Hills, MI (US); Michael Whitney, Auburn Hills, MI (US); William S. Smith, Auburn Hills, MI (US); Theophile Jullien, Auburn Hills, MI (US); Denis Thebault, Auburn Hills, MI (US); Jean Baptiste Lahilaire, Auburn Hills, MI (US)

(73) Assignees: Ford Global Technologies, LLC, Dearborn, MI (US); Valeo North America, Inc., Auburn Hills, MI (US)

( * ) Notice: Subject to any disclaimer, the term of this patent is extended or adjusted under 35 U.S.C. 154(b) by 338 days.

(21) Appl. No.: 17/209,456

(22) Filed: Mar. 23, 2021

(65) Prior Publication Data

US 2022/0306047 A1    Sep. 29, 2022

(51) Int. Cl.
*B60S 1/56*    (2006.01)
*F16K 31/06*    (2006.01)
(Continued)

(52) U.S. Cl.
CPC ............... *B60S 1/56* (2013.01); *B60S 1/481* (2013.01); *B60S 1/50* (2013.01); *B60S 1/52* (2013.01);
(Continued)

(58) Field of Classification Search
CPC ............ F16K 31/0655; F16K 31/0658; F16K 37/0041; B60S 1/481
See application file for complete search history.

(56) References Cited

U.S. PATENT DOCUMENTS

| 5,477,149 A | 12/1995 | Spencer et al. |
| 6,016,778 A * | 1/2000 | Koch ................... F16K 37/0041 123/90.11 |
| 2011/0260085 A1 | 10/2011 | van der Zee et al. |

FOREIGN PATENT DOCUMENTS

| EP | 0971278 A1 | 1/2000 |
| WO | 2020153081 A1 | 7/2020 |

* cited by examiner

*Primary Examiner* — Eric Keasel
(74) *Attorney, Agent, or Firm* — Frank A. Mackenzie; Bejin Bieneman PLC (57) ABSTRACT

An assembly includes an inlet tube and an outlet tube. The assembly includes a solenoid assembly having a plunger movable between an open position in which fluid is permitted to flow from the inlet tube to the outlet tube and a closed position in which fluid is inhibited from flowing from the inlet tube to the outlet tube. The solenoid assembly has a spring urging the plunger to the closed position. The assembly includes a first pressure sensor positioned to be compressed when the plunger is moved toward the open position. Pressure detected by the first pressure sensor indicates whether the plunger is at the open position. The assembly includes a second pressure sensor positioned to be compressed when the plunger is moved toward the closed position. Pressure detected by the second pressure sensor indicates whether the plunger is at the closed position.

19 Claims, 6 Drawing Sheets

(51) Int. Cl.
  *B60S 1/48* (2006.01)
  *B60S 1/50* (2006.01)
  *B60S 1/52* (2006.01)
  *G01S 7/497* (2006.01)
(52) U.S. Cl.
  CPC .. *F16K 31/0655* (2013.01); *G01S 2007/4977* (2013.01)

ASSEMBLY FOR SENSOR CLEANING WITH SOLENOID

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by obstructions, e.g., dust, snow, insects, etc.

DETAILED DESCRIPTION

An assembly includes an inlet tube and an outlet tube. The assembly includes a solenoid assembly having a plunger movable between an open position in which fluid is permitted to flow from the inlet tube to the outlet tube and a closed position in which fluid is inhibited from flowing from the inlet tube to the outlet tube. The solenoid assembly has a spring urging the plunger to the closed position. The assembly includes a first pressure sensor positioned to be compressed when the plunger is moved toward the open position. Pressure detected by the first pressure sensor indicates whether the plunger is at the open position. The assembly includes a second pressure sensor positioned to be compressed when the plunger is moved toward the closed position. Pressure detected by the second pressure sensor indicates whether the plunger is at the closed position.

The assembly may include a computer in communication with the second pressure sensor, the computer having a processor and a memory storing instructions executable by the processor to determine whether the plunger is at the closed position based on data received from the second pressure sensor.

The instructions may include instructions to store a diagnostic code in memory in response to determining that the plunger is not at the closed position.

The assembly may include a valve seat between the plunger and the outlet tube.

The plunger in the closed position may abut the valve seat.

The second pressure sensor may be at the valve seat.

The assembly may include a fluid reservoir fluidly connected with the inlet tube.

The assembly may include a nozzle fluidly connected with the outlet tube.

The assembly may include a camera, the nozzle facing the camera.

The second pressure sensor may include a fiber optic wire and define a cavity.

The second pressure sensor may include a membrane covering the cavity.

The second pressure sensor may include a piezo resistive pressure wire.

The solenoid assembly may include an induction coil surrounding the plunger, the induction coil actuatable to move the plunger to the open position.

A solenoid assembly includes a plunger movable between a first position and a second position. The solenoid assembly includes a spring urging the plunger to the second position. The solenoid assembly includes a first pressure sensor positioned to be compressed when the plunger is moved toward the first position. The solenoid assembly includes a second pressure sensor positioned to be compressed when the plunger is moved toward the second position. Pressure detected by the first pressure sensor indicates whether the plunger is at the first position and pressure detected by the second pressure sensor indicates whether the plunger is at the second position.

The second pressure sensor may include a fiber optic wire and defines a cavity.

The fiber optic wire may be less than 0.025 inches in width.

The second pressure sensor may include a membrane covering the cavity.

The second pressure sensor at the cavity may be less than 0.036 inches in width.

The second pressure sensor may include a piezo resistive pressure wire.

With reference to the Figures, wherein like numerals indicate like parts throughout the several views, a vehicle 20 having an assembly 22 that controls cleaning fluid, e.g., for autonomous operation of the vehicle 20 is shown. The assembly 22 includes an inlet tube 24 and an outlet tube 26. The assembly 22 includes a solenoid assembly 28 having a plunger 30 movable between an open position in which fluid is permitted to flow from the inlet tube 24 to the outlet tube 26 and a closed position in which fluid is inhibited from flowing from the inlet tube 24 to the outlet tube 26. The solenoid assembly 28 has a spring 32 urging the plunger 30 to the closed position. The assembly 22 includes a first pressure sensor 34 positioned to be compressed when the plunger 30 is moved toward the open position. Pressure detected by the first pressure sensor 34 indicates whether the plunger 30 is at the open position. The assembly 22 includes a second pressure sensor 36 positioned to be compressed when the plunger 30 is moved toward the closed position. Pressure detected by the second pressure sensor 36 indicates whether the plunger 30 is at the closed position.

Figure 1:
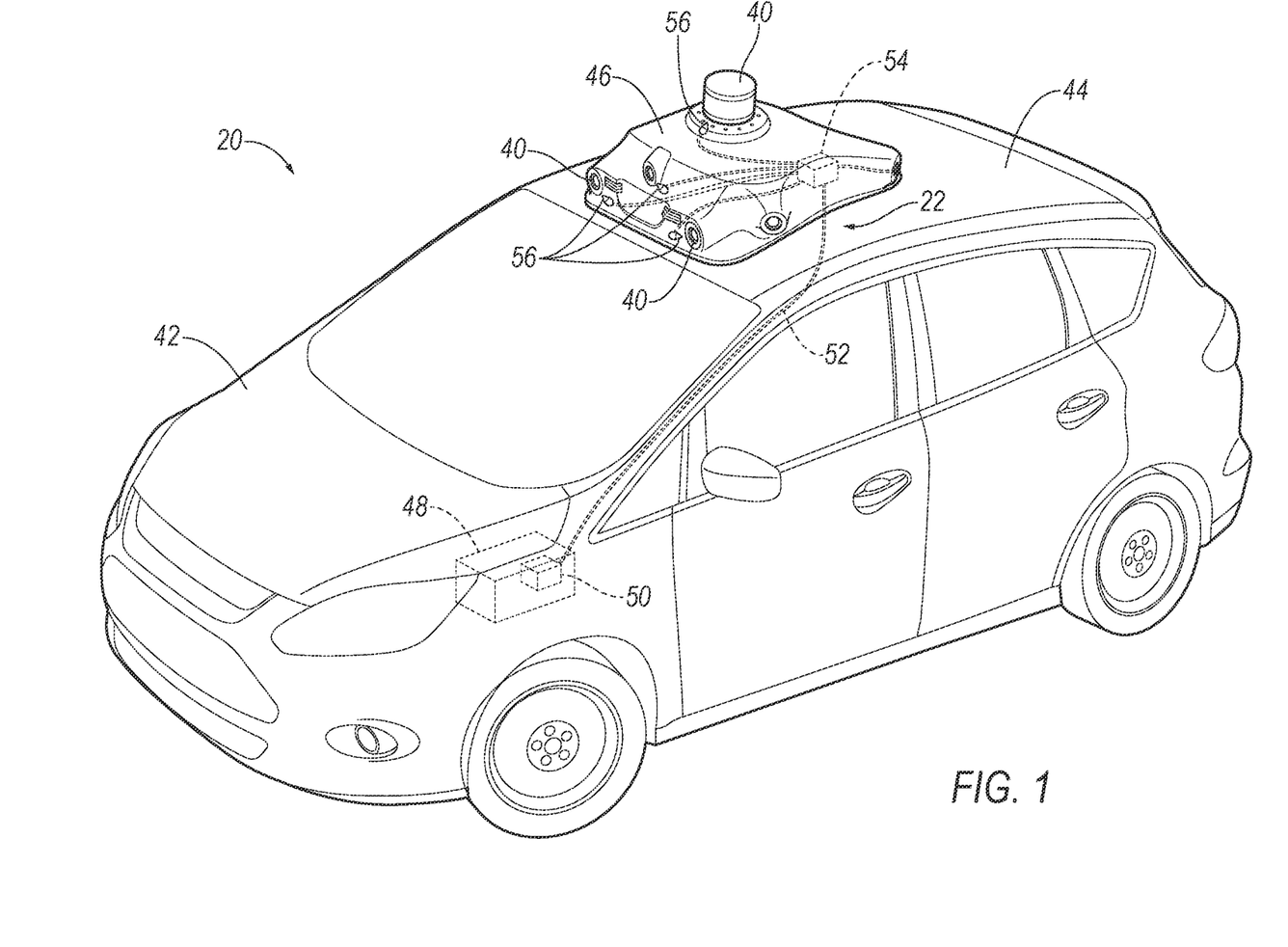
FIG. 1 is a perspective view of a vehicle having an assembly that controls cleaning fluid for sensors of the vehicle.

With reference to FIG. 1, the vehicle 20 can be any passenger or commercial automobile such as a car, a truck, a sport utility vehicle, a crossover, a van, a minivan, a taxi, a bus, etc.

Figure 6:
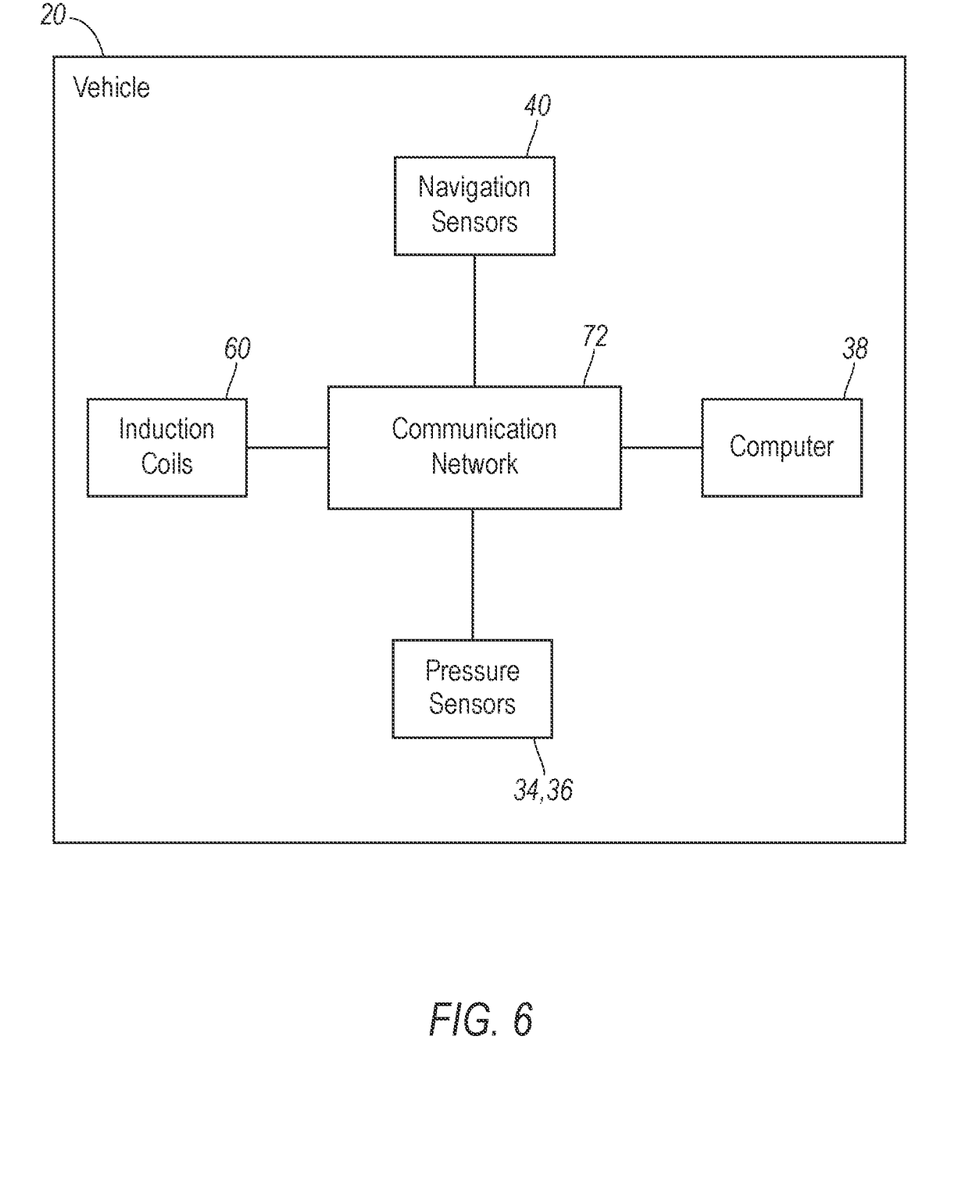
FIG. 6 is a block diagram of components of the vehicle and the assembly.

The vehicle 20 may be an autonomous vehicle. A computer 38 (as shown in FIG. 6) can be programmed to operate the vehicle 20 independently of the intervention of a human driver, completely or to a lesser degree. The computer 38 may be programmed to operate the propulsion, brake system, steering, and/or other vehicle systems based at least in part on data received from sensors 40. For the purposes of this disclosure, autonomous operation means the computer 38 controls the propulsion, brake system, and steering without input from a human driver; semi-autonomous operation means the computer 38 controls one or two of the propulsion, brake system, and steering and a human driver controls the remainder; and nonautonomous operation means a human driver controls the propulsion, brake system, and steering.

The vehicle 20 includes a body 42. The vehicle 20 may be of a unibody construction, in which a frame and the body 42 of the vehicle 20 are a single component. The vehicle 20 may, alternatively, be of a body-on-frame construction, in which the frame supports the body 42 that is a separate component from the frame. The frame and body 42 may be formed of any suitable material, for example, steel, aluminum, etc.

The body 42 includes body panels partially defining an exterior of the vehicle 20. The body panels may present a class-A surface, e.g., a finished surface exposed to view by a customer and free of unaesthetic blemishes and defects. The body 42 panels include, e.g., a roof 44, etc.

A housing 46 for the sensors 40 is attachable to the vehicle 20, e.g., to one of the body panels of the vehicle 20, e.g., the roof 44. For example, the housing 46 may be shaped to be attachable to the roof 44, e.g., may have a shape matching a contour of the roof 44. The housing 46 may be attached to the roof 44, which can provide the sensors 40 with an unobstructed field of view of an area around the vehicle 20. The housing 46 may be formed of, e.g., plastic or metal.

The sensors 40 may detect the location and/or orientation of the vehicle 20. For example, the sensors 40 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 40 may detect the external world, e.g., objects and/or characteristics of surroundings of the vehicle 20, such as other vehicles, road lane markings, traffic lights and/or signs, pedestrians, etc. For example, the sensors 40 may include radar sensors, scanning laser range finders, light detection and ranging (LIDAR) devices, and image processing sensors such as cameras. The sensors 40 may include communications devices, for example, vehicle-to-infrastructure (V2I) or vehicle-to-vehicle (V2V) devices.

The sensors 40 are disposed within, and/or are mounted to, the housing 46. For example, the sensors 40 can include multiple cameras disposed within the housing 46 and at least one LIDAR device mounted to the housing 46, as shown in FIG. 1.

Figure 2:
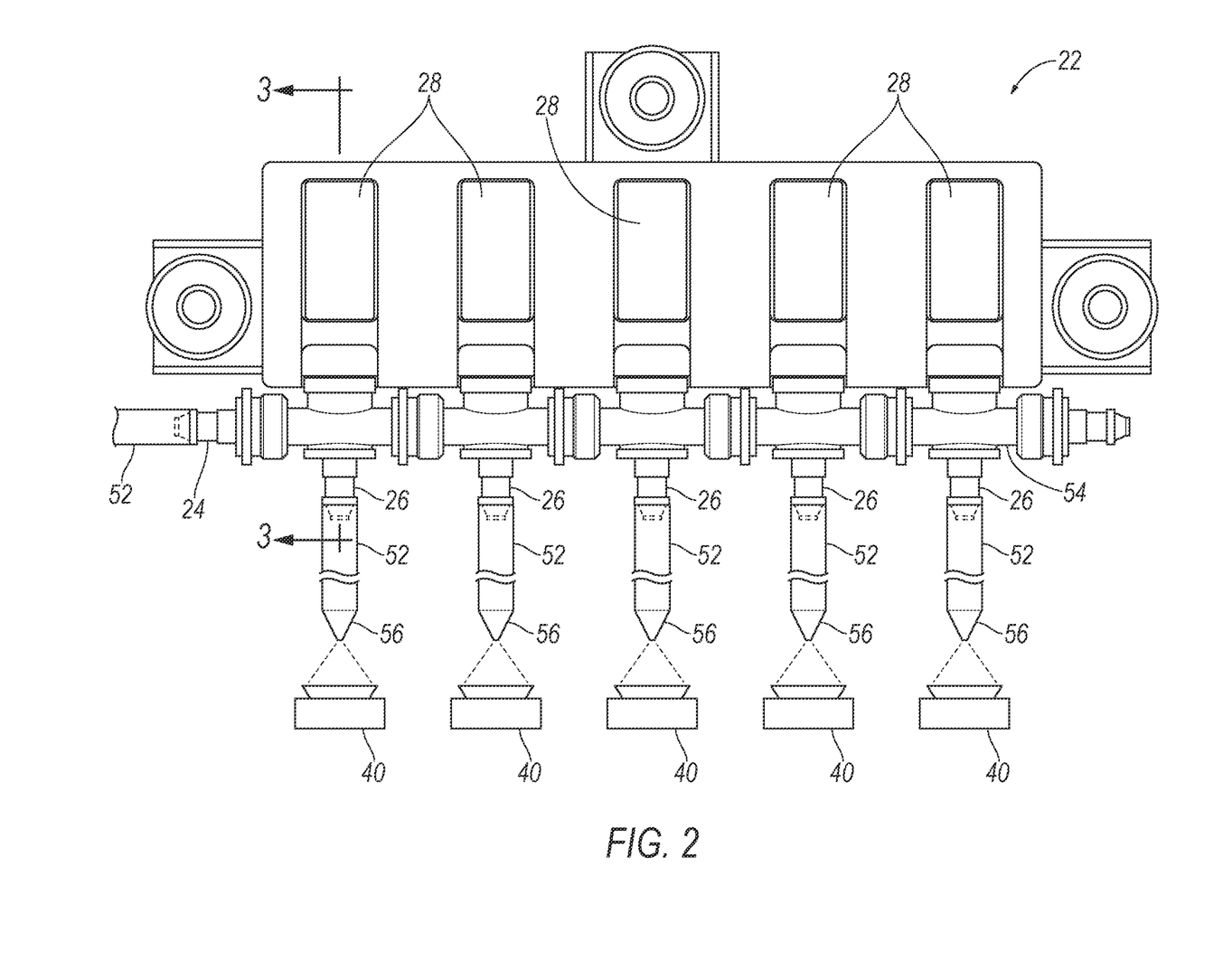
FIG. 2 is a side view of components of the assembly.

With reference to FIGS. 1 and 2, the assembly 22 may include includes a reservoir 48, a pump 50, supply lines 52, a manifold 54 (which includes the inlet tube 24 and one or more outlet tubes 26), and nozzles 56. The reservoir 48, the pump 50, the manifold 54, and the nozzles 56 are fluidly connected to each other (i.e., fluid can flow from one to the other) via the supply lines 52. The assembly 22 distributes washer fluid stored in the reservoir 48 to the nozzles 56. "Washer fluid" is any liquid stored in the reservoir 48 for cleaning. The washer fluid may include solvents, detergents, diluents such as water, etc. Alternatively or additionally, the assembly 22 could use compressed air routed through the manifold 54 and the supply lines 52 to the nozzles 56.

The reservoir 48 is a tank fillable with liquid, e.g., washer fluid for window cleaning. The reservoir 48 may be disposed in a front of the vehicle 20, specifically, in an engine compartment forward of a passenger cabin. Alternatively, the reservoir 48 may be disposed within the housing 46.

The pump 50 can force the washer fluid through the supply lines 52 and the manifold 54 to the nozzles 56 with sufficient pressure that the washer fluid sprays from the nozzles 56. The pump 50 is fluidly connected to the reservoir 48. The pump 50 may be attached to or disposed in the reservoir 48. The pump 50 is fluidly connected to the manifold 54, specifically to the inlet tube 24 the manifold 54, via one of the supply lines 52.

The manifold 54 includes the inlet tube 24 and one or more outlet tubes 26, which can vary in number. In the example shown in Figures, the manifold 54 includes five outlet tubes 26. The manifold 54 can direct washer fluid entering the inlet tube 24 to any combination of the outlet tubes 26. The manifold 54 can be disposed within, and fixed relative to, the housing 46.

The manifold 54 receives fluid from the reservoir 48 at the inlet tube 24. For example, one of the supply lines 52 may extend from the pump 50 to the inlet tube 24 of the manifold 54. The manifold 54 provides the fluid to one or more nozzles 56 via the outlet tubes 26. For example, the supply lines 52 may extend from the outlet tubes 26 of the manifold 54 to the nozzles 56. The supply lines 52 may be, e.g., flexible tubes.

Each of the nozzles 56 is fluidly connected to one of the outlet tubes 26 via one of the supply lines 52. The nozzles 56 may face the camera or other sensors 40 of the assembly 22. In other words, the nozzles 56 are positioned to eject the washing fluid to clear obstructions from fields of view of the sensors 40, e.g., the nozzles 56 may be aimed at the sensors 40 or at windows (not labeled) for the sensors 40. The washer fluid exiting the nozzles 56 can dislodge or wash away obstructions that may impede the fields of view of the sensors 40.

Figure 3:
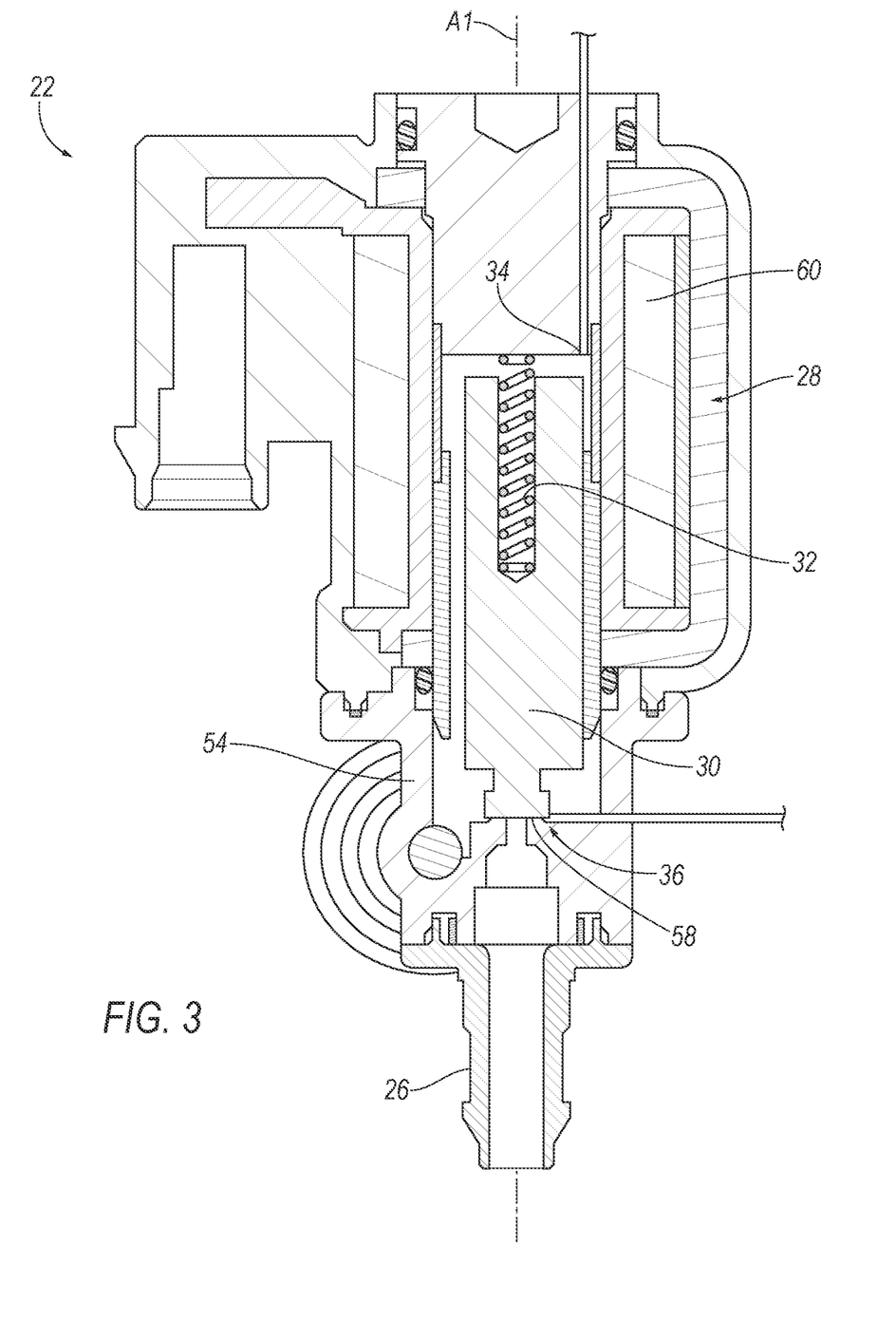
FIG. 3 is a cross section of components of the assembly in a closed position and taken along a line 3-3 of FIG. 2.
Figure 4:
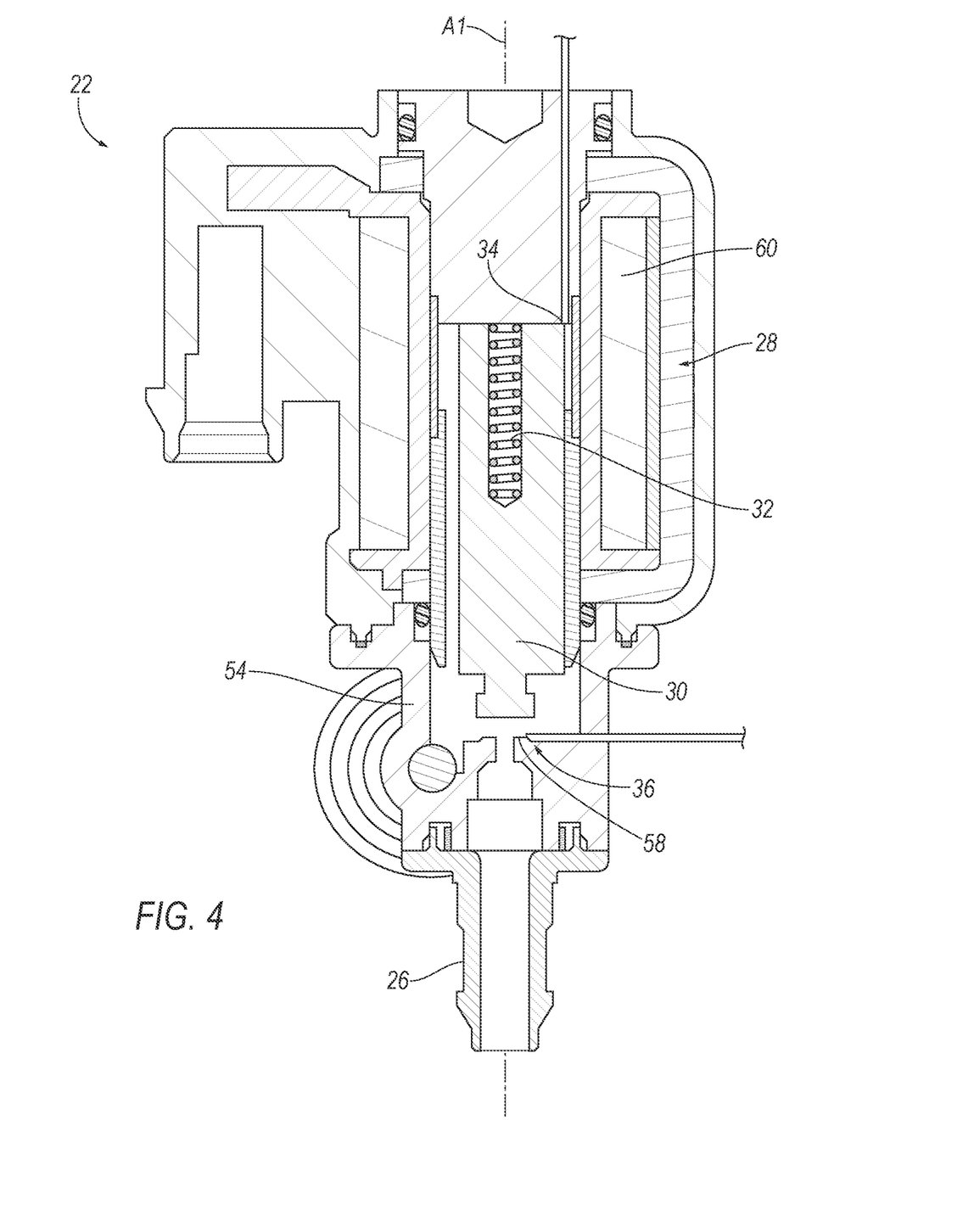
FIG. 4 is a cross section of components of the assembly in an open position and taken along the line 3-3.
Figure 5:
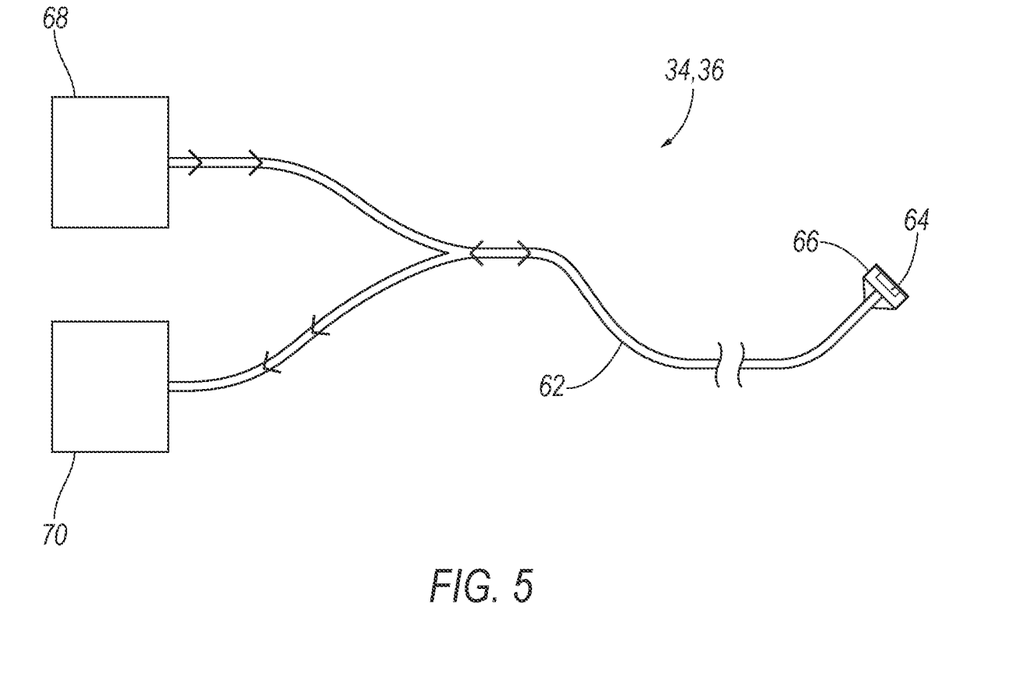
FIG. 5 is a schematic of components of a pressure sensor of the assembly.

With reference to FIGS. 2-4, the solenoid assembly 28 controls fluid flow from the inlet tube 24 to one of the outlet tubes 26 and the nozzle 56 connected thereto. The solenoid assembly 28 includes the plunger 30. The plunger 30 is movable along an axis A1 between a closed position, shown in FIG. 3, in which fluid is inhibited from flowing from the inlet tube 24 to such outlet tube 26 and an open position, shown in FIG. 4, in which fluid is permitted to flow from the inlet tube 24 to one of the outlet tubes 26. For example, the manifold 54 may include valve seats 58 surrounding each of the outlet tubes 26. The plunger 30 in the open position may be spaced from the valve seat 58 surrounding one of the outlet tubes 26. Fluid may flow through the space between the plunger 30 and the valve seat 58 into such outlet tube 26. The plunger 30 in the closed position may abut the valve seat 58 surrounding one of the outlet tubes 26. The plunger 30 and/or the valve seats 58 may include a rubber coating or other sufficient structure that seals the plunger 30 to the valve seat 58 in the closed position, i.e., such that fluid is inhibited from flowing therebetween.

With reference to FIGS. 3 and 4, the spring 32 of the solenoid assembly 28 includes a plurality of coils. The spring 32 is elongated between distal ends. For example, the spring 32 may be a conventional compression coil spring. One of the distal ends of the spring 32 may abut the plunger 30. The spring 32 may be under compression, urging the plunger 30 toward the closed position. For example, internal forces from the spring 32 may urge the plunger 30 toward the valve seat 58.

The solenoid assembly 28 includes an induction coil 60 surrounding the plunger 30. The induction coil 60 is actuatable to move the plunger 30 to the open position. The induction coil 60 includes a plurality of windings wound around the plunger 30. The induction coil 60 generates a magnetic field, e.g., in response to electric current flow through the windings. The magnetic field may urge the plunger 30 toward the open position. For example, when no current is supplied to the windings, force from the spring 32 may maintain the plunger 30 at the closed position. Upon application of electric current to the windings, force from the magnetic field generated by the induction coil 60 may overcome the force of the spring 32 and move the plunger 30 to the open position.

The pressure sensors 34, 36, shown in FIGS. 3-6, detect an amount of pressure applied thereto. The pressure sensors 34, 36 may each output a voltage that is directly proportional to a pressure applied to the respective pressure. For example, the pressure sensors 34, 36 may each include a piezo resistive pressure wire. The piezo resistive pressure wire may include a piezo resistive sensor element at a distal end of a radiopaque flexible wire tip of the piezo resistive pressure wire. As another example, and with reference to FIG. 5, the pressure sensors 34, 36 may each include a fiber optic wire 62 and define a cavity 64 at a distal end of the fiber optic wire 62. The fiber optic wire 62 may less than 0.025 inches in width. The cavity 64 may be less than 0.036 inches in width. Such dimensions may enable placement of the pressure sensors 34, 36 within the manifold 54 and/or solenoid assembly 28. A membrane 66 may cover the cavity 64. The fiber optic wire 62 may be provided with light from a light source 68, such as a light emitting diode or the like. The fiber optic wire 62 may be connected to an optical sensor 70 such as a charge-coupled device. Light from the light source 68 may travel from through the fiber optic wire 62 to the membrane 66. From the membrane 66 the light may travel through the fiber optic wire 62 to the optical sensor 70. An amount of phase delay between emissions of light and subsequential detections may vary according to an amount of deflection of the membrane 66 caused by pressure applied thereto.

Returning to FIGS. 3 and 4, the first pressure sensor 34 is positioned to be compressed when the plunger 30 is moved toward the open position. For example, the first pressure sensor 34 may be supported by the solenoid assembly 28 above the plunger 30, i.e., such that the plunger 30 is between the first pressure sensor 34 and the valve seat 58 along the axis A1 in both the open and closed positions. The plunger 30 moves toward the first pressure sensor 34 when actuated from the closed position to the open position.

The second pressure sensor 36 is positioned to be compressed when the plunger 30 is moved toward the closed position. For example, the second pressure sensor 36 may be supported at the valve seat 58 of the outlet tube 26, e.g., below the plunger 30 along the axis A1, i.e., between the plunger 30 and the valve seat 58 along the axis A1 in both the open and closed positions. The plunger 30 moves toward the second pressure sensor 36 when actuated from the open position to the closed position The pressure detected by the first pressure sensor 34 indicates whether the plunger 30 is at the open position. For example, the first pressure sensor 34 may detect a first predetermined amount of pressure when the plunger 30 is sufficiently spaced from the valve seat 58 such that fluid may freely flow through the outlet tube 26. The first predetermined amount of pressure may be stored in memory of the computer 38. The pressure detected by the second pressure sensor 36 indicates whether the plunger 30 is at the closed position. For example, the second pressure sensor 36 may detect a second predetermined amount of pressure when the plunger 30 abuts the valve seat 58 such that fluid is inhibited from flowing through the outlet tube 26. The second predetermined amount of pressure may be stored in memory of the computer 38.

The assembly 22 may include multiple solenoid assemblies 28 that control fluid flow through the outlet tubes 26 of the manifold 54. The solenoid assemblies 28 may be fixed to the manifold 54, e.g., one of the solenoid assemblies 28 may be at each of the outlet tubes 26. Each of the solenoid assemblies 28 may include the plunger 30, the spring 32, the first pressure sensor 34 and the second pressure sensor 36, e.g., as described herein. The first pressure sensor 34 and the second pressure sensor 36 detected a pressure applied by the plunger 30 of such solenoid assembly 28. One of the solenoid assemblies 28 may control fluid flow through one of the outlet tubes 26 to one of the nozzles 56, and another of the solenoid assemblies 28 may control fluid flow through another of the outlet tubes 26 to another of the nozzles 56. For example, the solenoid assemblies 28 can independently block or open each of the respective outlet tubes 26 by moving the plungers 30 of the solenoid assemblies 28.

With reference to FIG. 6, the computer 38 is a microprocessor-based controller implemented via circuits, chips, or other electronic components. The computer 38 includes a processor and a memory such as are known. The memory includes one or more forms of computer readable media, and stores instructions executable by the computer 38 for performing various operations, including as disclosed herein. The computer 38 may be programmed to execute operations disclosed herein. Specifically, the memory stores instructions executable by the processor to execute the operations disclosed herein and electronically stores data and/or databases. For example, the computer 38 may include one or more dedicated electronic circuit including an ASIC (Application Specific Integrated Circuit) that is manufactured for a particular operation. In another example, the computer 38 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g., stored in a memory electrically connected to the FPGA circuit. In some examples, a combination of processor(s), ASIC(s), and/or FPGA circuits may be included inside a chip packaging. The computer 38 may be a set of computers communicating with one another.

The computer 38 is generally arranged for communications on a communication network 72 that can include a bus in the vehicle 20 such as a controller area network (CAN) or the like, and/or other wired and/or wireless mechanisms. Via the communication network 72, the computer 38 may transmit messages to various devices, and/or receive messages (e.g., CAN messages) from the various devices, e.g., the sensors 40, the induction coils 60 of the solenoid assemblies 28, the first pressure sensors 34, the second pressure sensors 36, the propulsion, brake system, and steering, etc. Alternatively or additionally, in cases where the computer 38 comprises a plurality of devices, the communication network 72 may be used for communications between devices represented as the computer 38 in this disclosure.

The computer 38 is programmed to, i.e., the memory stores instructions executable by the processor to, actuate the plungers 30 of the respective solenoid assemblies 28, e.g., from the open position to the closed position and vice versa. The computer 38 may actuate the plunger 30 of one of the solenoid assemblies 28 to the open position by transmitting a command to such solenoid assembly 28, e.g., via the communication network 72. The command may, for example, provide a specified voltage to the induction coil 60 of the solenoid assembly 28 and generate a magnetic field that urges the plunger 30 away from the valve seat 58 with sufficient force to overcome the force applied to the plunger 30 by the spring 32. The computer 38 may actuate the plunger 30 to the closed position by transmitting a command to the solenoid assembly 28, e.g., via the communication network 72. The command may, for example, cease providing the specified voltage to the induction coil 60 of the solenoid assembly 28, thereby permitting force from the spring 32 to move the plunger 30 to the closed position in abutment with the valve seat 58. The computer 38 may individually and selectively actuate the solenoid assemblies 28, i.e., actuate one or more of the solenoid assemblies 28, and not others. The computer 38 may individually and selectively actuate the solenoid assemblies 28 to clean selected sensors 40, such as cameras, of the vehicle 20.

The computer 38 is programmed to determine whether the plunger 30 of each of the solenoid assemblies 28 is at the open position based on data received from the first pressure sensor 34 of such solenoid assembly 28. The computer 38 may determine whether the plunger 30 is at the open position by comparing the pressure detected by the first pressure sensor 34 with a first predetermined amount of pressure. The computer 38 may determine the plunger 30 is at the open position when the pressure detected by the first pressure sensor 34 is equal to (or greater than) the first predetermined amount of pressure. The computer 38 may determine the plunger 30 is not at the open position when the pressure detected by the first pressure sensor 34 is less than the first predetermined amount of pressure. The first predetermined amount may be stored in memory and predetermined by empirical testing, e.g., the first predetermined amount may be equal to a pressure detected by the first pressure sensor 34 when the plunger 30 is known to be in the open position, e.g., when fluid pressure is supplied to the inlet tube 24 and fluid freely flows from the respective outlet tube 26. The computer 38 may individually determine whether the plunger 30 of each of the solenoid assemblies 28 is at the open position based on data received from the first pressure sensor 34 of the respective solenoid assembly 28. The computer 38 may determine whether the plunger 30 of one of the solenoid assemblies 28 is at the open position after the computer 38 actuates the plunger 30 to the open position, e.g., after the computer 38 has commanded application of a specified voltage to the induction coil 60 of such solenoid assembly 28.

The computer 38 is programmed to store a diagnostic code, e.g., in memory, upon determining the plunger 30 of one of the solenoid assemblies 28 is not at the open position. The diagnostic code may include data specifying which specific solenoid assembly 28 included the plunger 30 that was determined not to be at the open position. Additionally and upon determining the plunger 30 of one of the solenoid assemblies 28 is not at the open position, the computer 38 may transmit an error code to a server computer, and/or transition the vehicle 20 from autonomous operation to nonautonomous operation.

The computer 38 is programmed to determine whether the plunger 30 is at the closed position based on data received from the second pressure sensor 36. The computer 38 may determine whether the plunger 30 is at the closed position by comparing the pressure detected by the second pressure sensor 36 with the second predetermined amount of pressure. The computer 38 may determine the plunger 30 is at the closed position when the pressure detected by the second pressure sensor 36 is equal to (or greater than) the second predetermined amount of pressure. The second predetermined amount of pressure may be predetermined by empirical testing. The second predetermined amount of pressure may be determined as equal to a pressure detected by the second pressure sensor 36 when the plunger 30 is known to be in the closed position, e.g., when fluid pressure is supplied to the inlet tube 24 and does not flow from the outlet tube 26 closed by the plunger 30. The second predetermined amount of pressure may be stored in memory. The computer 38 may determine the plunger 30 is not at the closed position when the pressure detected by the second pressure sensor 36 is less than the second predetermined amount of pressure. For example, a pressure detected by the second pressure sensor 36 may be less when dirt or other debris inhibits the spring 32 from fully extending and moving the plunger 30 to the closed position than a pressure detected by the second pressure sensor 36 when the spring 32 is fully extended with the plunger 30 in the closed position abutting the valve seat 58. The computer 38 may individually determine whether the plunger 30 of each of the solenoid assemblies 28 is at the closed position based on data received from the second pressure sensor 36 of the respective solenoid assembly 28. The computer 38 may determine whether the plunger 30 of one of the solenoid assemblies 28 is at the closed position after the computer 38 actuates such plunger 30 to the closed position, e.g., after the computer 38 has ceased providing voltage to the induction coil 60 of such solenoid assembly 28. The computer 38 may be programmed to, upon determining the plunger 30 of one of the solenoid assemblies 28 is not at the closed position, store a diagnostic code, etc.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Use of "in response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   an inlet tube;
   an outlet tube; and
   a solenoid assembly having a plunger movable between an open position in which fluid is permitted to flow from the inlet tube to the outlet tube and a closed position in which fluid is inhibited from flowing from the inlet tube to the outlet tube;
   the solenoid assembly having a spring urging the plunger to the closed position;
   a first pressure sensor positioned to be compressed when the plunger is moved toward the open position, pressure detected by the first pressure sensor indicates whether the plunger is at the open position; and
   a second pressure sensor positioned to be compressed when the plunger is moved toward the closed position, pressure detected by the second pressure sensor indicates whether the plunger is at the closed position.

2. The assembly of claim 1, further comprising a computer in communication with the second pressure sensor, the computer having a processor and a memory storing instructions executable by the processor to determine whether the plunger is at the closed position based on data received from the second pressure sensor.

3. The assembly of claim 2, wherein the instructions include instructions to store a diagnostic code in memory in response to determining that the plunger is not at the closed position.

4. The assembly of claim 1, further comprising a valve seat between the plunger and the outlet tube.

5. The assembly of claim 4, wherein the plunger in the closed position abuts the valve seat.

6. The assembly of claim 4, wherein the second pressure sensor is at the valve seat.

7. The assembly of claim 1, further comprising a fluid reservoir fluidly connected with the inlet tube.

8. The assembly of claim 7, further comprising a nozzle fluidly connected with the outlet tube.

9. The assembly of claim 8, further comprising a camera, the nozzle facing the camera.

10. The assembly of claim 1, wherein the second pressure sensor includes a fiber optic wire and defines a cavity.

11. The assembly of claim 10, wherein the second pressure sensor includes a membrane covering the cavity.

12. The assembly of claim 1, wherein the second pressure sensor includes a piezo resistive pressure wire.

13. The assembly of claim 1, wherein the solenoid assembly includes an induction coil surrounding the plunger, the induction coil actuatable to move the plunger to the open position.

14. A solenoid assembly, comprising:
    a plunger movable between a first position and a second position;
    a spring urging the plunger to the second position;
    a first pressure sensor positioned to be compressed when the plunger is moved toward the first position; and
    a second pressure sensor positioned to be compressed when the plunger is moved toward the second position; and
    wherein pressure detected by the first pressure sensor indicates whether the plunger is at the first position and pressure detected by the second pressure sensor indicates whether the plunger is at the second position.

15. The solenoid assembly of claim 14, wherein the second pressure sensor includes a fiber optic wire and defines a cavity.

16. The solenoid assembly of claim 15, where in the fiber optic wire is less than 0.025 inches in width.

17. The solenoid assembly of claim 15, wherein the second pressure sensor includes a membrane covering the cavity.

18. The solenoid assembly of claim 17, wherein the second pressure sensor at the cavity is less than 0.036 inches in width.

19. The solenoid assembly of claim 14, wherein the second pressure sensor includes a piezo resistive pressure wire.

* * * * *